Oct. 11, 1932.   J. L. BACON ET AL   1,882,172
BOTTLE MAKING MACHINE
Filed Sept. 28, 1926   4 Sheets-Sheet 1

INVENTORS

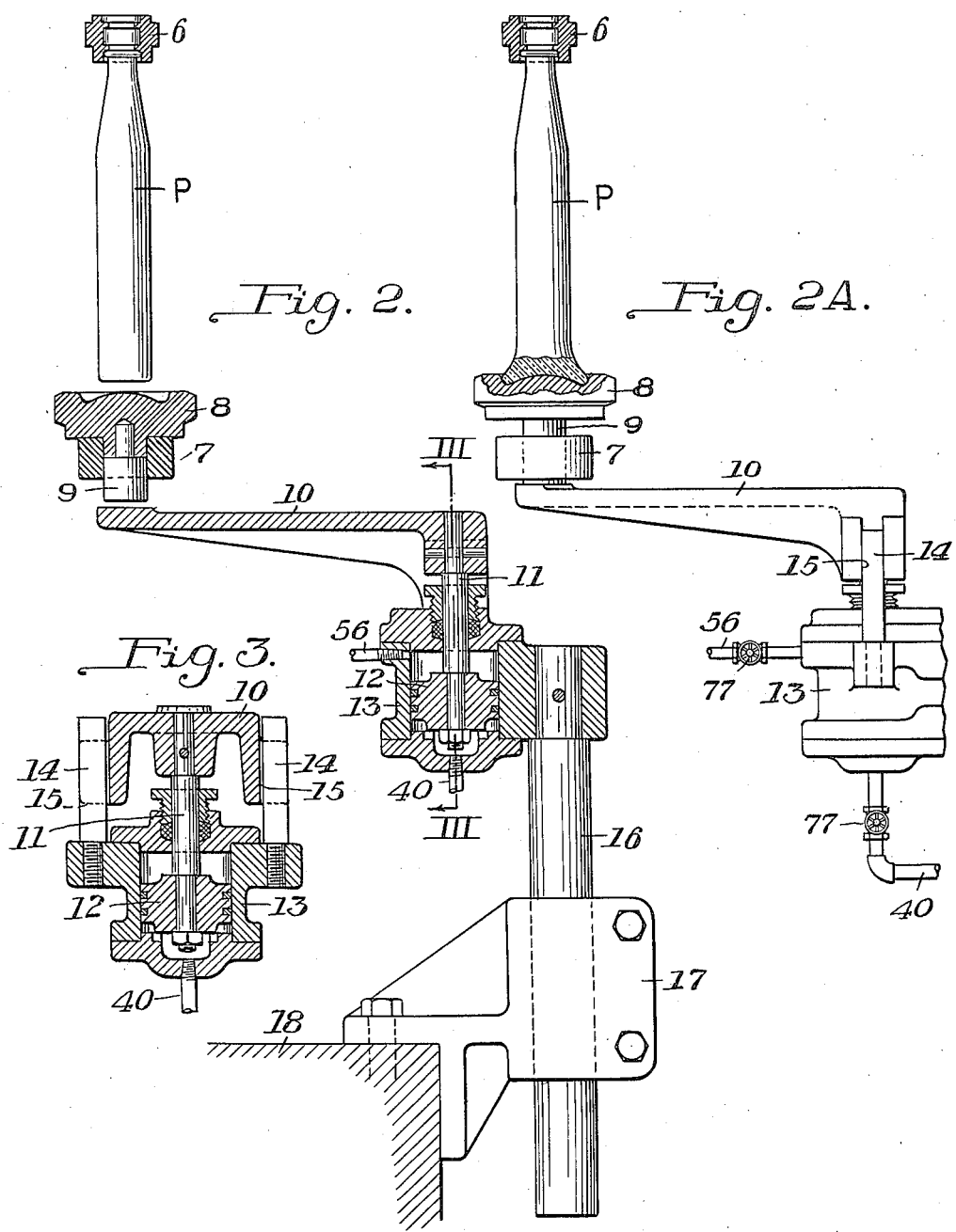

Oct. 11, 1932.  J. L. BACON ET AL  1,882,172
BOTTLE MAKING MACHINE
Filed Sept. 28, 1926  4 Sheets-Sheet 3
Fig. 4.
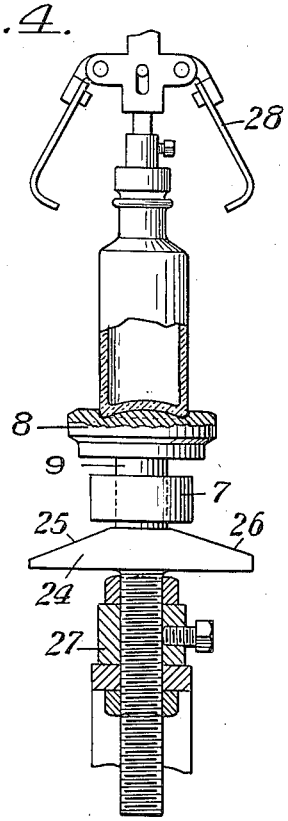
Fig. 5.
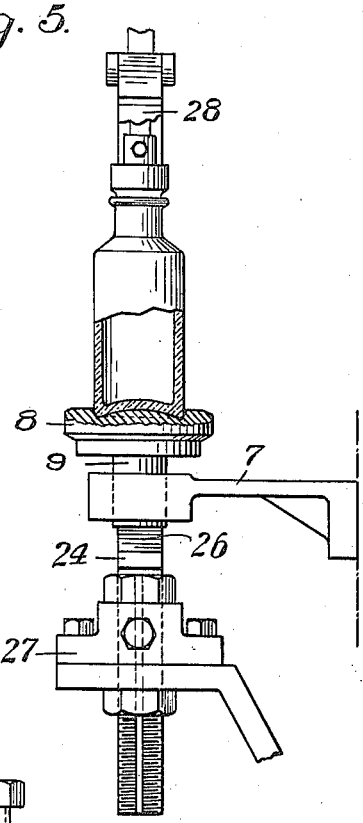
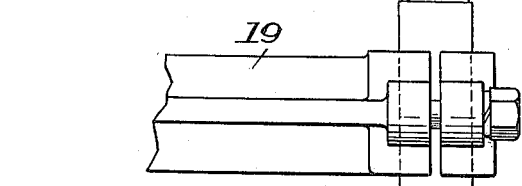
Fig. 6.
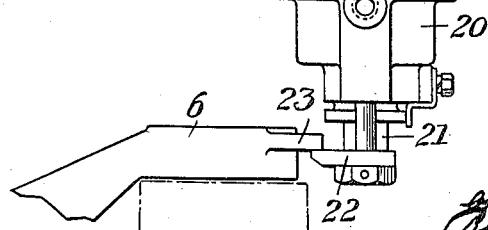
INVENTORS

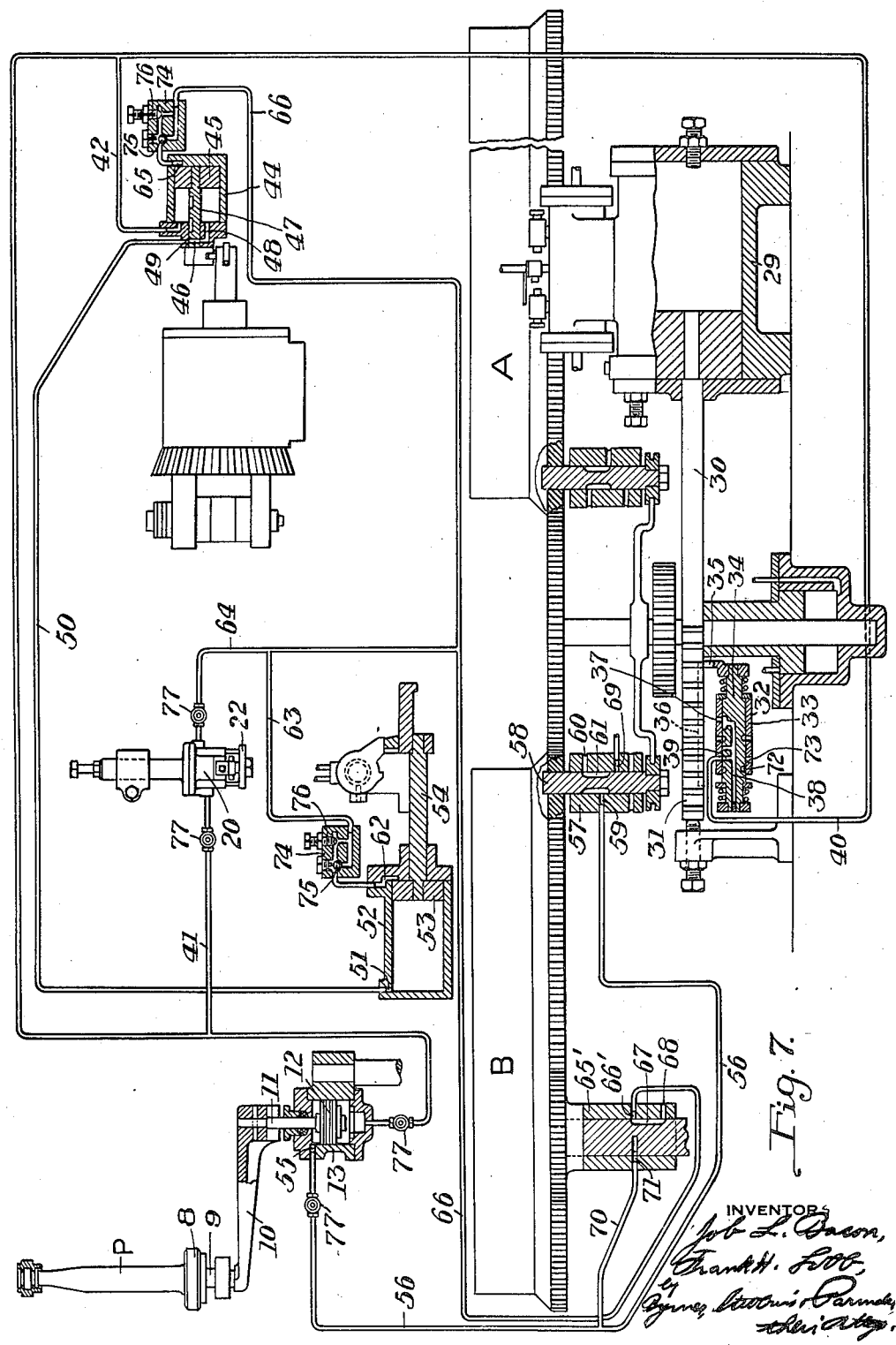

Patented Oct. 11, 1932

1,882,172

UNITED STATES PATENT OFFICE

JOB L. BACON AND FRANK H. LOBB, OF MILLVILLE, NEW JERSEY, ASSIGNORS TO WHITALL TATUM COMPANY, OF MILLVILLE, NEW JERSEY, A CORPORATION OF NEW JERSEY

BOTTLE MAKING MACHINE

Application filed September 28, 1926. Serial No. 138,164.

The present invention relates to glass working machinery, and more particularly to improvements therein, especially applicable to the manufacture of blown ware such as bottles and the like.

At the present time it is customary with automatic and semi-automatic machinery to manufacture blown ware by the use of a plurality of molds, usually mounted for movement from station to station intermittently by means of a single table or a plurality of tables. Experience has demonstrated that with machines of this character, uniformity of glass distribution in successive articles is not insured. It is one of the objects of the present invention to provide an improved apparatus whereby uniformity of glass distribution in successive articles is obtained.

Where the molds are caused to travel intermittently from station to station under such conditions that a blank mold receives a charge at one station, moves this charge to a succeeding station, and then opens to permit transfer of the parison to a blow mold, there is nothing to insure proper positioning of the parison before the blow mold closes therearound. By reason of the intermittent table movement the parisons are frequently not centered in a true vertical position at the time of transfer and this results in a non-uniform distribution of the glass. The present invention has specifically for one of its objects the provision of means whereby the parisons are not only properly centered, but whereby uniform glass distribution therein is insured. The invention in this respect contemplates the holding of the suspended parison rigidly in a true vertical position symmetrically disposed with respect to the longitudinal axis of the parison in such manner that unequal stretch or "run" of the parison is prevented. In this manner, uniform bottoms are obtained on all of the ware produced.

In the accompanying drawings we have shown more or less diagrammatically for purposes of illustration only, a preferred embodiment of the present invention, it being understood that the drawings do not define the limits of our invention as changes in the construction and operation disclosed therein may be made without departing either from the spirit of the invention or the scope of our broader claims. In the drawings:

Figure 2 is a detail sectional view illustrating the bottom lifter, Figure 2A is a view similar to Figure 2 showing the bottom lifted into engagement with a parison for supporting the same.

Figure 3 is a detail sectional view on the line III—III of Figure 2,

Figure 4 is a detail view, partly in elevation and partly in section, illustrating the manner of supporting the finished ware during the removal thereof, Figure 5 is a side elevation of a construction shown in Figure 4;

Figure 6 is a side elevational view of the neck mold lifting mechanism, and

Figure 7 is a diagrammatic view illustrating the operating connections for the various parts.

Figure 1:
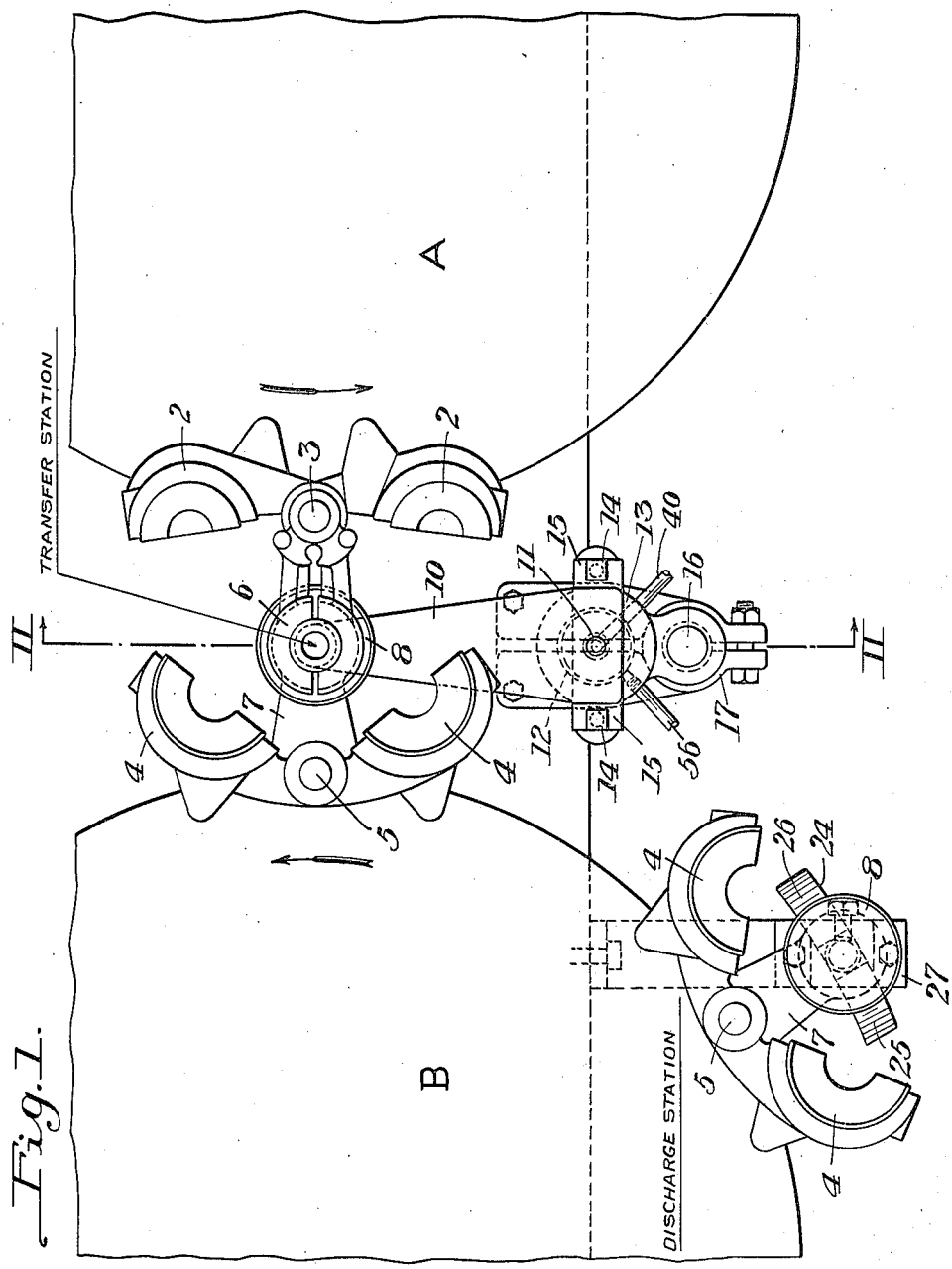
Figure 1 is a top plan view of a portion of a glass working machine illustrating the present invention.

The present invention is applicable to standard glass working machines of different types, and is herein disclosed for purposes of illsutration only as being aplied to a two-table machine. Referring to the drawings, there is illustrated a blank mold table A and a blow mold table B mounted for rotation in the direction indicated by the respective arrows thereon in Figure 1. Carried by the blank mold table is a plurality of blank molds, as well understood in the art, each blank mold comprising openable halves 2 carried by a suitable pivotal mounting 3. The blow mold table similarly carries a plurality of openable blow molds each comprising mold halves 4 suitably mounted on a pivot 5.

The tables are so positioned that during the operation thereof each blank mold is adapted to bring its finished parison to a predetermined position at which the parison may be received by the blow mold. For this purpose the construction is herein illustrated as comprising blank molds and blow molds adapted to close around a common center during the transferring operation although such a construction need not be utilized in obtaining the advantages of our invention.

In Figure 1, the blank mold which has just brought a finished parison to the transfer station, is shown as having opened away from the parison, leaving the parison supported by a neck mold 6 as well understood in the art. While so suspended by the neck mold, the parison may be received by the blow mold by the mere act of closing the mold halves 4 therearound.

In ordinary practice, so far as we are aware, no special provision has been made in glass working apparatus of this general nature for accurately positioning, centering and rigidly supporting the parison at the transfer station and during the transfer operation. By reason of the absence of any supporting and centering means of this character, parisons have not infrequently stretched or run variable amounts, or assumed such unsymmetrical conditions with respect to the true longitudinal axis of the parisons, as to result in the production of poor quality ware. The non-uniformity of glass distribution under such conditions has been particularly objectionable from the standpoint of the bottoms produced in the finished articles. Not infrequently, the bottoms have had thick and thin portions with a very considerable variation between these portions.

In accordance with the present invention, we provide means for accurately centering and properly supporting a parison not only prior to the actual closing of the blow mold therearound, but after the closing of the blow mold, in such manner that when the movement of the blow mold is initiated the parison is not caused by its own inertia to swing to one side of the blow mold as has heretofore been inevitable.

In accordance with the illustrated embodiment of our invention, we provide the blow mold table with a plurality of brackets 7 suitably secured thereto and projecting outwardly therefrom with one bracket for each mold. Each of these brackets carries a mold bottom 8 having a downwardly projecting stem 9 vertically movable with respect to the bracket from the position indicated for example, in Figure 2 to the position shown in Figure 2A. In Figure 2, the parison P is shown suspended from the neck mold 6 at the transfer station indicated in Figure 1. As the blank mold halves open away from the parison, it is left vertically suspended with a uniform glass distribution as effected by and within the enclosed cavity of the blank mold. Before this parison has had an opportunity to stretch or run unevenly, the mold bottom 8 is moved upwardly into engagement therewith as indicated in Figure 2A. This upward movement of the mold bottom is obtained by a mold lifter comprising a horizontally projecting arm 10 carried at one end on a piston rod 11 and underlying at its outer end the stem 9 of a mold bottom 8 positioned at the transfer station. The arm 10 is adapted to be raised and lowered at will by means of a piston 12 movable within a cylinder 13. For properly guiding the arm 10 during its vertical movement, and for preventing unequal wear or binding on the piston rod 11 there may be provided guide pins 14 projecting upwardly from the cylinder and engaging guide grooves 15 in the arm 10. The entire cylinder with its associated parts is carried on the upper end of a support 16 adjustable in the clamp 17 supported rigidly from the base or frame 18 of the machine. By reason of this construction, the parts can be initially so positioned and mounted that the desired relationship between the outer end of the arm 10 and the bottom of the stems 9 is insured.

It has been found in actual practice that due to the overhang of the neck molds or neck rings, they not infrequently assume a slight downward inclination in the direction of overhang, such that the parisons carried thereby are not suspended in the proper position for engagement by the blow mold halves. Continued operation of the machine causes this condition to become more aggravated due to wear of the parts. In order to correct this, there may be provided a construction as shown more particularly in Figure 6 of the drawings in which there is illustrated a bracket 19 extending outwardly from a fixed portion of the machine and carrying a cylinder 20 in which is vertically movable a piston rod 21. This piston rod at its lower end carries a lateral projection 22 adapted to extend under a projection 23 on each of the neck molds, whereby, upon upward movement of the piston rod 21, the neck mold engaged by the lifting device will be raised to a truly horizontal position, thereby holding the suspended parison in a true vertical position.

After the blow mold closes into position around the parison, it holds the bottom 8 against movement, and the bottom in turn supports the parison. Upon starting the blow mold table, the parison is not thrown laterally as has heretofore been the case, but is held properly centered and ready for the succeeding forming operations.

After the article has been completely formed, the rotation of the table B brings it to the discharge station shown in Figure 1. At this station the blow mold halves 4 are opened to free the finished article, illustrated in Figures 4 and 5 as comprising a bottle. As the opening of the blow mold halves releases the bottom 8 so that it would be free to drop away from the bottle in the absence of other means, we provide at the discharge station, a cam 24 having oppositely inclined portions 25 and 26 respectively. The cam 24 is vertically adjustable in a bracket 27 suitably supported from a stationary part of the frame. When the cam has been properly adjusted, the stems 9 on the bottoms 8 will rest on the high part of the cam so as to be held in supporting relationship to the finished article when the blow mold halves are opened. Such a condition is illustrated in Figure 4, in which figure a take-out device 28 is illustrated as ready to engage and remove the finished article. After the removal of such article, the movement of the table permits the bottom to gradually drop to its lower position as controlled by the cam surface 26.

It is obviously of importance to provide means for properly co-relating and timing the movement of the respective parts of the apparatus, and a suitable arrangement for this purpose is diagrammatically indicated in Figure 7 of the drawings, which figure is illustrative of a standard bottle making machine, well understood by those skilled in the art. In this figure there is indicated diagrammatically a fluid pressure cylinder 29 effective through its piston rod 30 and the rack bar 31 for imparting successive movements to the tables A and B at predetermined times. Controlled by the rack 31 is a rack valve 32 comprising a casing 33 and a plunger 34. The plunger at one end carries a projection 35 cooperating with a groove 36 in the under side of the rack bar 31 in such manner that at predetermined points in the travel of the rack 31 the plunger 34 is shifted. In Figure 7, the parts are shown in the position which they occupy at the conclusion of a table moving operation. At this time the port 37 in the rack valve 32 is in communication with a flow passage 38 in the plunger 34. The port 37 is in constant communication with a source of fluid under pressure, not shown, whereby with the parts in this position, fluid under pressure passes through the port 37 and passage 38 to the port 39 communicating with the pipe 40. This permits fluid under pressure to flow through the pipe 40 to the branch 41 leading to the lower end of the neck ring lifting cylinder 20. This insures upward movement of the projection 22 substantially as soon as the molds come to rest at the transfer station. At the same time, fluid is admitted to the lower end of the cylinder 13 for raising the piston 12 therein and causing the arm 10 to engage the stem 9 and move the bottom 8 upwardly into engagement with the parison which is freed by the opening of the blank mold. Also at this time, fluid under pressure passes through the branch 42 to the inlet 43 in one end of a blank mold opening cylinder 44. This is effective for moving the piston 45 therein to the right as viewed in Figure 7 and thereby bringing the transverse port 46 in the piston rod 47 into registration with the port 48 communicating with the interior of the cylinder, and the port 49 communicating with the pipe 50. Fluid under pressure thus passes from the interior of the cylinder 44 to the pipe 50 and thence to the inlet port 51 of the blow mold closing cylinder 52. By reason of this relationship of the parts, it will be apparent that the blank mold must have been completely opened before fluid under pressure can be delivered to the cylinder 52 for moving the blow mold halves to closed position. This insures proper timing in this respect.

Within the blow mold closing cylinder 52 is a piston 53 operatively connected to a piston rod 54 by means of which the desired operation of the blow mold halves is effected.

As the pistons in the bottom plug lifting cylinder, the neck ring lifting cylinder, the blow mold closing cylinder and the blank mold opening cylinder move under the influence of fluid pressure delivered thereto from the pipe 40 and its respective branches, it will be apparent that fluid pressure must be exhausted from the opposite ends of these cylinders. For this purpose the cylinder 13 communicates at its upper end through a port 55 with a pipe 56 leading to a control valve comprising a casing 57 and a plunger 58. It will be apparent that it is not desirable to permit raising of the bottom lifting device until the tables have completed their movement and are properly locked in position. The plunger 58 constitutes locking means, as diagrammatically indicated in Figure 7, for the table B. In its upper position, as indicated in this figure, the port 59 through the casing is in communication with the exhaust port 60 therein through the reduced portion 61 on the plunger. This permits the cylinder 13 to freely exhaust to the atmosphere. The blow mold closing cylinder has a port 62 communicating with the pipe line 63, and the neck ring lifting cylinder has the upper end of its cylinder 20 connected to a pipe 64 communicating with the pipe 63. The right hand end of the blank mold opening cylinder 44 has a port 65 connected to pipe 66 communicating with the pipe 64. The pipe 66, in turn, communicates with a rotor valve 65' controlled by the rotation of the table B, whereby when the parts assume the position indicated in Figure 7 of the drawings, the pipe 66 may discharge through the port 66', passage 67 and port 68 to the atmosphere.

Before the neck ring lifting device, the blank mold opening cylinder, or the blow mold closing cylinder can operate, it will be apparent that the table must have assumed a predetermined position, as their operation is dependent upon the prior operation of the locking means.

After the operation of the various parts referred to, it becomes necessary, either before or simultaneously with movement of the table, to return the various parts to their original positions. This is accomplished by the unlocking of the tables, the unlocking operation bringing the reduced portion 61 of the plunger 58 into communication with the port 69 which constantly receives fluid under pressure. At this time, fluid under pressure will pass from the port 69 around the reduced portion 61 of the plunger to the port 59 and thence through pipe 56 to the upper end of the cylinder 13. It will also pass to the connection 70 leading to the port 71 in the rotor valve whereby when the table assumes a predetermined position, fluid will pass from the port 71 to the port 66' and thence to pipe 66 and its communicating branches 64 and 63, leading respectively to the upper end of the neck ring lifting cylinder and the right hand end of the blow mold closing cylinder. At this time, the various cylinders will all be open to exhaust through the pipes which previously delivered fluid pressure thereto. This is accomplished by reason of the fact that the movement of the rack 31 for effecting movement of the tables will move the valve 34 into such position that the reduced portion 72 will be brought into registration with the port 39 and the discharge port 73, thereby permitting free exhaust to the atmosphere.

In many cases it is desirable to provide the different connections with control or bleed valves whereby certain timing operations may be obtained. We have thus shown the blow mold closing cylinder and the blank mold opening cylinder as having their closing and opening movements respectively controlled by check bleeder valves 74 permitting free flow of fluid thereto, past the check valves 75 when the pistons are moving in one direction, but restricting flow by the adjusting screws 76 during movement in the opposite direction. The neck ring lifting cylinder and the bottom lifting cylinder may each have both the inlet and outlet connections provided with valves 77 comprising ordinary controlling valves for permitting a greater or smaller flow per unit of time through the respective pipes in which they are positioned.

By reason of the present invention we are enabled to utilize parisons of greater length than has heretofore been possible and correspondingly reduce the amount of elongation. In other words, by means of the positive actuation of the mold bottoms, it is possible to use parisons having a greater initial length and more nearly conforming to the final dimension of the article produced therefrom. In such cases, irregular elongation will not take place, and the upward movement of the bottoms will directly engage the parisons and assist in partially shaping the same as apparent from Figure 2A in addition to the supporting action obtained.

While it has heretofore been proposed to utilize neck ring lifting devices of the general character herein referred to, we are not aware that such a device has ever been used in combination with means for otherwise improving the glass distribution. While each device alone possesses merit, the full advantages of the neck ring lifter are only realized in a combination of the general nature herein shown.

Certain advantages of the present invention arise from the provision of an apparatus whereby longer parisons may be utilized thereby reducing the uncertainty resulting from uncontrolled elongation thereof.

A further advantage of the present invention arises from the provision of means for positively engaging and supporting parisons during the transferring operation.

Still further advantages arise from the provision of a glass working apparatus such that a parison is transferred to a blow mold while accurately supported and is supported therein at the time of commencement of movement of the blow mold away from the transfer station.

Still further advantages of the invention arise from the provision of a glass working machine having means insuring proper positioning of a neck mold during the transfer operation and for insuring centering and supporting of a parison sustained from such neck mold.

We claim:

1. In a glass working apparatus, a rotatable blank mold table, a rotatable blow mold table, said tables being rotatable about laterally offset axes, means for effecting transfer of a parison from a blank mold on one table to a blow mold on the other table, and means for centering the parison during the transfer operation, said means being engaged by the blow mold and effective for holding the parison against swinging movement upon rotation of the blow mold from the position of transfer, said means including a vertically movable mold bottom and means at the transfer station for moving said bottom upwardly into engagement with the parison while the molds are stationary.

2. In a glass working apparatus, a blank mold table, a blow mold table, said tables being rotatable about laterally offset axes, means for imparting to said tables a step by step movement about said axes, blank molds on the blank table, blow molds on the blow table, said molds being successively brought to a stationary position at a transfer station upon said step by step movement, means for effecting transfer at said station of a parison from a blank mold on one table to a blow mold on the other table and means for centering the parison during the transfer operation, said means being engaged by the blow mold at the transfer station and effective for holding the parison against swinging movement upon rotation of the blow mold from the position of transfer, said means including a vertically movable mold bottom and means at the transfer station for moving said bottom upwardly into engagement with the parisons while the molds are stationary.

3. In a glass working apparatus, a blank mold table, a blow mold table, blank and blow molds respectively on said tables, means for operating said tables to bring the molds thereon to a transfer station and hold the same against travelling movement while at said station, a neck ring effective for supporting a parison released by a blank mold at the transfer station, carrying means for the neck ring, positioning means for the neck ring, and means engaged by a blow and cooperating with a parison suspended from a neck ring for properly centering the same.

4. In a glass working apparatus, a blank mold table, a blow mold table, blank and blow molds respectively on said tables, means for operating said tables to bring the molds thereon to a transfer station, a neck ring effective for supporting a parison released by a blank mold at the transfer station, carrying means for the neck ring, positioning means for the neck ring, and means engaged by a blow mold and cooperating with a parison suspended from a neck ring for properly centering the same.

5. In a glass working apparatus, a blank mold table, a blow mold table, blank and blow molds respectively on said tables, means for operating said tables to bring the molds thereon to a transfer station and hold the same against travelling movement while at said station, a neck ring effective for supporting a parison released by a blank mold at the transfer station, carrying means for the neck ring, positioning means for the neck ring, and means engaged by a blow mold and cooperating with a parison suspended from a neck ring for properly centering the same, said last mentioned means including a vertically movable mold bottom with means for moving said bottom upwardly into engagement with such parison while held against travelling movement.

6. In a glass working apparatus, a blank mold table having blank molds thereon, a blow mold table having blow molds thereon, said tables being rotatable about laterally offset axes, means for rotating said tables to bring the molds thereon to a transfer station, a neck ring cooperating with each blank mold and effective for supporting a parison released by a blank mold at the transfer station, and means engageable by a blow mold and cooperating with a parison suspended from a neck ring for properly centering the same, said means including a movable mold bottom with means effective for moving said mold bottom upwardly into actual engagement with a suspended parison.

7. In a glass working apparatus, a blank mold table having blank molds thereon, a blow mold table having blow molds thereon, means for imparting to said tables a step by step movement about laterally offset axes to bring the molds thereon successively to a transfer station and maintain the same stationary at said station, a neck ring for each blank mold, said neck rings being effective for supporting a parison released by a blank mold at the transfer station, and means engageable by a blow mold at said station for cooperating with a parison suspended from a neck ring at said station for properly centering the same, said means including a movable mold bottom together with means located at said station for moving said bottom upwardly into engagement with the lower end of the parison at said station.

8. In a glass working machine, a plurality of blank molds, a plurality of blow molds each having a movable mold bottom, means for bringing such molds in succession to a transfer station and transferring a parison from a blank mold to a blow mold, and common means at said transfer station for moving said bottoms into position for centering a parison during transfer from a blank mold to a blow mold.

9. In a glass working machine, a plurality of blank molds, a plurality of blow molds each having a movable mold bottom, means for bringing such molds in succession to a transfer station and transferring a parison from a blank mold to a blow mold, and common means at said transfer station for moving said bottoms into position for centering a parison during transfer from a blank mold to a blow mold, said transfer means comprising means for automatically opening a blank mold to release a parison and for automatically closing a blow mold to engage said parison in timed relation one to the other.

10. In a glass working machine, a plurality of blank molds, a plurality of blow molds, means for bringing such molds in succession to a transfer station, means at said transfer station for transferring a blank from a blank mold to blow mold and for centering such parison during transfer, said means comprising a fluid pressure operated bottom lifter common to all of the blow molds, and means for timing the operation of said fluid pressure operated bottom lifter.

11. In a glass working machine, a plurality of blank molds, a plurality of blow molds, means for imparting to said molds a step by step movement for successively bringing the same to rest at a transfer station, means at said transfer station for effecting transfer of a parison from a blank mold to a blow mold and for centering such parison during transfer, said means comprising a fluid pressure operated bottom lifter located at the transfer station and common to all of the blow molds, and means for timing the operation of said fluid pressure operated bottom lifter.

12. In a glass working machine, a blank mold, a blow mold, separate tables movable about laterally offset axes for supporting the respective molds, said blow mold being adapted to receive a parison from said blank mold, a movable bottom for the blow mold, means for positively raising said bottom into engagement with a parison after opening of the blank mold but before transfer of the parison to the blow mold, and means for opening the blank mold to release a parison and for closing the blow mold to engage the parison in timed relation to the movement of said bottom.

13. In a glass working machine, a plurality of blank molds, a plurality of blow molds, a movable bottom for each of said blow molds, fluid pressure means common to all of said movable bottoms for raising each of said bottoms vertically prior to a closing movement of the blow molds, and means for timing the operation of said fluid pressure means relative to a closing movement of the blow molds.

14. In a glass working machine, a plurality of blank molds, a plurality of blow molds, a movable bottom for each of said blow molds, fluid pressure means common to all of said movable bottoms for raising each of said bottoms vertically prior to a closing movement of the blow molds, means for timing the operation of said fluid pressure means relative to a closing movement of the blow molds, and means for opening a blank mold to release a parison and for closing a blow mold to engage the parison in timed relation to each other and to the raising of a movable bottom.

15. In a glass working machine, a blank mold having a neck ring, a blow mold, separate tables movable about laterally offset axes for supporting the molds, means for opening said blank mold to leave a blank suspended in said neck ring at a transfer station, means for closing said blow mold, said blank mold and blow mold being operative to closed position around a common vertical axis at said transfer station, connections insuring opening of a blank mold before closing of a blow mold, a movable bottom for the blow mold, and connections insuring raising of said movable bottom after opening of the blank mold but before closing of the blow mold.

16. In a glass working machine, a blank mold, a neck ring, a blow mold, separate tables movable about laterally offset axes for supporting the respective molds, means for opening said blank mold at a transfer station to leave a blank suspended in the neck ring, means for closing the blow mold at said station, connections insuring opening of a blank mold before closing of a blow mold, a movable bottom for the blow mold, and connections insuring raising of said movable bottom to engage a parison after opening of the blank mold but before closing of the blow mold.

17. In a glass working apparatus, blank molds and blow molds, separate tables movable about laterally offset axes for supporting said molds, means for moving said tables to bring said molds to a transfer station, means for effecting transfer of a parison at said station, and fluid pressure means at said transfer station movable in opposition to the elongating tendency of a parison for centering a parison during the transfer operation, said last mentioned means including a movable mold bottom.

18. In a glass working apparatus, blank molds and blow molds, separate tables movable about laterally offset axes for supporting said molds, means for moving said tables to bring said molds to a transfer station and maintain the same stationary at said station, means for effecting transfer of a parison at said station, and fluid pressure means at said transfer station movable in opposition to the elongating tendency of a parison for centering a parison during the transfer operation, said last mentioned means including a movable mold bottom.

19. In a glass working apparatus, blank molds including neck rings, blow molds including movable mold bottoms, means for bringing said molds to a transfer station, means for opening a blank mold at said station, means for closing a blow mold at said station to effect a transfer operation of a parison, fluid pressure means permanently located at said transfer station for effecting vertical movement of said mold bottoms in succession for centering the parisons during the transfer operation at said station, and means for timing the operation of said fluid pressure means.

20. In a glass working apparatus, a plurality of blank molds each including a neck ring, a plurality of blow molds, means for bringing said molds successively to a transfer station, means for opening the blank molds at said station to leave the parison suspended in the neck rings, vertically movable supporting means for the neck rings, and means cooperating with a parison suspended from a neck ring for properly centering the same.

21. In a glass working apparatus, a plurality of blank molds each including a neck ring, a plurality of blow molds, means for bringing said molds successively to a transfer station, means for opening the blank molds at said station to leave the parison suspended in the neck rings, vertically movable supporting means for the neck rings, and means cooperating with a parison suspended from a neck ring for properly centering the same, said last mentioned means including movable mold bottoms engageable by the blow molds.

22. In a glass working apparatus, blank molds each including a neck ring, blow molds, means for bringing said molds into cooperative transfer relation at a transfer station, vertically adjustable supporting means cooperating with the neck rings at the transfer station for accurately suspending the same, and means cooperating with the bottom ends of the parisons for centering the parisons.

23. In a glass working apparatus, blank molds each including a neck ring, blow molds, means for bringing said molds into cooperative transfer relation at a transfer station, vertically adjustable supporting means cooperating with the neck rings at the transfer station for accurately suspending the same, and means cooperating with the bottom ends of the parisons for centering the parisons, said last mentioned means including movable mold bottoms engageable by the blow molds.

24. In a glass working apparatus, blank molds, blow molds, means for bringing said molds successively to a transfer station, a neck ring for each blank mold for holding a blank during transfer from a blank mold to a blow mold, carrying means for the neck rings, positioning means for the neck rings, means for adjusting the position of said positioning means, and movable centering means for the lower ends of the blanks carried by the neck rings.

25. In a glass working apparatus, blank molds, blow molds, means for bringing said molds successively to a transfer station, a neck ring for each blank mold for holding a blank during transfer from a blank mold to a blow mold, carrying means for the neck rings, positioning means for the neck rings, means for adjusting the position of said positioning means, and movable centering means for the lower ends of the blanks carried by the neck rings, said movable centering means including mold bottoms engageable by the blow molds.

26. In a glass working apparatus, a blank mold, a blow mold, a neck ring cooperating with the blank mold for supporting a blank during transfer from the blank mold to the blow mold, vertically movable elevating means for the neck ring to cause a blank supported thereby to hang in symmetrical relation about its longitudinal axis, and supporting means including a movable mold bottom for engaging and centering the bottom of the blank while so supported.

27. In a glass working machine, the combination with a pair of tables rotatable about laterally offset axes, molds on the respective tables, means for rotating the tables to bring a mold on one table into transfer relationship to a mold on the other table, neck rings for supporting the blanks during the transfer operation, movable mold bottoms, and means having a fixed position intermediate the tables for effecting movement of said mold bottoms for centering the blanks supported by the neck rings.

28. In a glass working apparatus, means including a neck ring for forming a glass blank, means for bringing the blank to a transfer station, means engaging the neck ring for centering the blank by bringing the same into symmetrical relation about a vertical axis at said station, means for then engaging the lower end of such centered blank for controlling the elongation thereof and maintaining the same in centered position, a blow mold, and means for thereafter closing the blow mold about the centered blank.

29. In a glass working apparatus, means for forming a glass blank, including a neck ring, means for bringing the blank to a transfer station, means engaging the neck ring for centering the blank by bringing the same into symmetrical relation about a vertical axis at said station, a blow mold including a movable bottom, means for moving said bottom into engagement with the lower end of such centered blank for controlling the elongation thereof and maintaining the same in centered position, and means for thereafter closing the blow mold about the centered blank and movable mold bottom.

30. In a glass working machine, a plurality of blank molds each including a neck ring, a plurality of blow molds each including a movable bottom, means for effecting operation of said molds in timed relation to bring cooperating pairs of molds successively to a transfer station, means at said station common to all of said neck rings for centering a blank by bringing it into symmetrical relation about a vertical axis, means at said station for moving said bottoms to engage the lower end of a centered blank, and means for closing a blow mold around such centered blank.

31. In a glass working machine, a pair of molds including a blank mold with its neck ring and a blow mold with a movable bottom, means for intermittently moving said molds, means for forming a blank in the blank mold and neck ring, means operative while the blank is at rest for bringing the same into symmetrical relation about a vertical axis, means including said bottom for engaging the lower end of the blank while so maintained for controlling elongation thereof, and means for thereafter closing a blow mold about the blank.

32. In a glass working machine, supporting means, means for intermittently moving the supporting means, molds carried by the supporting means, transfer means for transferring a parison from one mold to another, means for locking the supporting means between successive movements thereof, and means controlled by said locking means for centering a blank to be transferred.

In testimony whereof we have hereunto set our hands.

JOB L. BACON.
FRANK H. LOBB.